UNITED STATES PATENT OFFICE 2,271,501

CENTRIFUGAL SEPARATING PROCESS

Ashton T. Scott, Ardmore, Pa., assignor to The Sharples Corporation, Philadelphia, Pa., a corporation of Delaware No Drawing. Application October 23, 1939, Serial No. 300,804

6 Claims. (Cl. 233—1)

The present invention pertains to processes for separating from a liquid a substance which is insoluble therein, but which is difficult to separate from said liquid. Such difficulty in separation may be the result of the fact that only a slight difference in specific gravity exists between the liquid and the substance to be separated, or it may be due to other factors.

Other factors being equal, it is more difficult to separate suspended material from a liquid in cases in which the material is finely dispersed in the liquid than in cases in which the material is less finely subdivided. This fact is well known from practical experience to persons associated with problems of centrifugal separation, and it is also obvious from theoretical reasoning (see Alliott, Centrifugal Driers and Separators, 1926 edition, pages 80 to 83, involving a discussion of Stokes law). The separating force operative to cause movement of a given particle from a liquid in which it is suspended is a function of the mass of the particle, which is in turn a function of its volume, and is proportional to the cube of a linear dimension of the particle (assuming symmetry of the particle for the sake of discussion). The principal force which resists the separating effect, on the other hand, is a function of the surface area of the particle, since this force is the result of frictional resistance between the surface of the particle and the liquid in which it is suspended. Since the surface area is proportional to the square of a linear dimension, it will be understood that the force tending to resist separation of a particle increases only as the square of a linear dimension, as the size of the particle increases. As a concrete instance of the above, let us consider the separating and resisting forces applicable in the centrifugation of a substance dispersed in a liquid in the form of spherical particles of radius $r$, under given conditions of application of centrifugal force to the mixture. The separating force will be proportional to $r^3$, and the resisting force will be proportional to $r^2$. Assuming now that the mixture is subjected to intense agitation, and that, as a result of this agitation, each of the particles is divided into 1000 smaller spherical particles, each having a radius of $$\frac{r}{10}$$

the separating force applicable to each individual particle will now be proportional to $$\frac{r^3}{1000}$$

whereas the resisting force due to friction will be proportional to $$\frac{r^2}{100}$$

It will thus be seen, that by subdividing the individual particles into smaller particles, each having a radius of one-tenth of that of the original particles, the separating force on each particle is only one one thousandth of the separating force on the original particles, whereas the frictional resistance on each individual particle is now one one hundredth of the resisting force on the original particles; i. e., that the ratio of the resisting force to the separating force has been increased tenfold. It will be quite evident that the rate of subsidence of the subdivided particles through the liquid will be much slower than would be the rate of subsidence of the original particles, assuming, in each case, that the same centrifugal force is applied. If the degree of dispersion of the dispersed material is sufficiently great, the rate of subsidence may be reduced to practically nil. The present invention involves a novel application of the physical principle discussed above, in the solution of problems of centrifugation.

The present invention is applicable to solution of difficulties involved in separation of substances from liquids, regardless of the cause of said difficulties. It involves a process by which the effective specific gravity difference between the liquid and the substance to be separated is materially increased. Increase in such specific gravity difference assists in the separating operation, regardless of the original cause of the difficulty encountered in separation of the substance from the liquid.

The present invention is applicable to solution of difficulties encountered in separation of substances from liquids by centrifugal force, regardless of whether said substances be liquids, plastics, or solids.

An object of the invention has been to make it possible to effect efficient separation of liquid, plastic or solid substances dispersed in a liquid, in cases in which efficient centrifugal separation would ordinarily be impossible or relatively inefficient by the use of economically applicable centrifugal forces to the separation problem.

A second object of the invention has been to render efficient separation possible with the application of lower degrees of centrifugal force than would otherwise be necessary to effect such separation between liquids and insoluble substances dispersed therein.

In the practice of the invention, separation difficulties encountered in separating an insoluble liquid, plastic or solid from a liquid in which it is dispersed are solved by dispersing an insoluble "weighting" material in the mixture of the liquid medium and substance to be separated therefrom. If the added material is dispersed very finely in the mixture which is later to be subjected to centrifugation, this added material will act to increase the effective specific gravity of the liquid from which the substance is to be separated, just as though it had been dissolved in the liquid. The subsequent centrifugation of the mixture produced by adding said material to the mixture of liquid and substance to be separated has a tendency to effect separation of the added material from the mixture. If the added material is sufficiently finely dispersed in the mixture, however, the resistance to separation of said added material caused by frictional resistance of this finely dispersed material is sufficiently great to prevent its subsidence, and the added material is thus retained in its finely dispersed form in the continuous liquid phase during the centrifugal separating step. This will be evident from a consideration of the discussion above of Stokes law and the respective separating and resisting forces effective when an attempt is made to separate a substance in finely dispersed form from a liquid in which it is suspended.

As a specific instance of the above, let us consider the application of the principle of the invention to the separation of rubber particles from their original suspension in the aqueous phase of rubber latex. If barium sulfate is dispersed in very finely divided form in the original rubber latex suspension, this barium sulfate increases the effective specific gravity of the continuous phase, constituting the aqueous liquid in which the rubber particles are suspended. The barium sulfate, being much more finely dispersed in the aqueous medium than the rubber particles, has the same specific gravity effect, when added to rubber latex, as though it were a liquid of high specific gravity and soluble in the aqueous phase. When the resulting suspension of rubber particles and finely dispersed barium sulfate in the aqueous phase is later subjected to a moderate degree of centrifugal force, the rubber particles are separated from the suspension of barium sulfate in the aqueous phase, but the barium sulfate is not separated, since the frictional resistance of the finely dispersed barium sulfate particles in the aqueous medium is sufficiently great to prevent such separation. The dispersion of barium sulfate in the aqueous phase functions, under the influence of centrifugal force, as though it were a homogeneous liquid of much higher specific gravity than the original aqueous phase, and the separation of the rubber particles under the influence of centrifugal force is accomplished more efficiently than could otherwise be accomplished.

The material added to weight the liquid from which a substance is to be separated in the practice of the invention does not necessarily need to be a solid material. In some cases, a liquid of relatively high specific gravity, which is insoluble in the liquid from which separation of the substance is to be accomplished, may be added to the mixture of said substance with the liquid from which it is to be separated. It will usually be desirable, in connection with the addition of an insoluble liquid to effect the weighting function, to add an emulsifying agent to keep the added liquid material in finely dispersed form in the original liquid from which separation is to be accomplished. As examples of liquids which may be added to mixtures in the assistance of centrifugal separation in the practice of the invention, the chlorinated hydrocarbons, such as chloroform, tetra-chlor-ethane, di-chlor-ethane and di-chlor-propane are useful. When a solid material is used to perform the weighting function, such solid material should be a material which is capable of being extremely finely dispersed in the liquid from which separation is to be accomplished, or a material capable of adsorbing a part of the liquid in question. Barium sulfate, sulfur, aluminum hydrate, silica gel, gelatin, etc., for example, may be used to perform this function.

While the invention has been discussed above in connection with problems in which it is desirable to increase the effective specific gravity of the liquid vehicle, it will be evident that the invention is also applicable to problems in which it may be desirable to disperse in the liquid a material having the effect of reducing the effective specific gravity of the liquid. Thus, in case the particles to be separated are of higher specific gravity than the original liquid, it may be desirable to add to the original mixture a material which effectively decreases the specific gravity of the liquid and thus affords a higher effective specific gravity difference between the substance to be removed and the liquid medium from which that substance is to be removed.

The material added in accordance with the present invention to increase the specific gravity difference between the liquid vehicle and the substance to be removed can be added either in a relatively pure form or in suspension or solution in a liquid, since the effect of incorporating the material of the desired specific gravity is to increase the specific gravity difference between the original vehicle and the substance to be removed, regardless of just how the added material is incorporated in finely dispersed form in the original liquid vehicle.

The material added to effect increase of specific gravity difference in accordance with this invention may be recovered from the liquid vehicle after the centrifugal separation step discussed above, in various ways, as by filtration, distillation, etc., depending on the exact nature of the added material. The material so recovered may be re-used, by mixing it with a fresh quantity of a mixture of the original liquid and the substance to be separated therefrom.

While the invention has been discussed above in connection with solution of problems involving suspension in a liquid of a single substance to be removed therefrom, it will be evident that the invention may be practiced in the separation of two or more substances from a single liquid, regardless of whether the substances to be separated from the liquid are each of lower specific gravity than the effective specific gravity of the weighted liquid, each of higher specific gravity than the effective specific gravity of said liquid, or some of lower specific gravity and some of higher specific gravity than said liquid.

Various modifications of the invention will be obvious to those skilled in the art from the above discussion of the principle and certain illustrative examples thereof, and I do not therefore wish to be limited except by the scope of the sub-joined claims.

I claim:

1. In the separation of a substance from a mixture of that substance with a liquid in which said substance is insoluble, the process comprising finely dispersing in said mixture insoluble material of higher specific gravity than said liquid and being sufficiently finely divided to separate from said liquid at a slower rate than the substance to be separated therefrom and substantially increase the subsidence rate attainable by centrifugation of the resulting mixture by substantially increasing the effective specific gravity difference between said substance and the liquid containing the added material, and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

2. In the separation of a liquid substance from a mixture of that substance with a liquid in which said substance is insoluble, the process comprising finely dispersing in said mixture insoluble material of higher specific gravity than said liquid and being sufficiently finely divided to separate from said liquid at a slower rate than the substance to be separated therefrom and substantially increase the subsidence rate attainable by centrifugation of the resulting mixture by substantially increasing the effective specific gravity difference between said substance and the liquid containing the added material, and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

3. In the separation of a plastic substance from a mixture of that substance with a liquid in which said substance is insoluble, the process comprising finely dispersing in said mixture insoluble material of higher specific gravity than said liquid and being sufficiently finely divided to separate from said liquid at a slower rate than the substance to be separated therefrom and substantially increase the subsidence rate attainable by centrifugation of the resulting mixture by substantially increasing the effective specific gravity difference between said substance and the liquid containing the added material, and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

4. In the separation of a solid substance from a mixture of that substance with a liquid in which said substance is insoluble, the process comprising finely dispersing in said mixture insoluble material of higher specific gravity than said liquid and being sufficiently finely divided to separate from said liquid at a slower rate than the substance to be separated therefrom and substantially increase the subsidence rate attainable by centrifugation of the resulting mixture by substantially increasing the effective specific gravity difference between said substance and the liquid containing the added material, and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

5. In the separation of a substance from a mixture of that substance with a liquid in which said substance is insoluble, the process comprising finely dispersing in said mixture insoluble material differing in specific gravity from the liquid to an extent sufficient to impart to the liquid, upon addition of said material, an effective specific gravity which differs from the specific gravity of the substance to be separated by an amount greater than the specific gravity difference between the liquid and the substance to be separated therefrom and being adapted to separate from said liquid at a slower rate than the substance to be separated therefrom and to substantially increase the rate of subsidence of the substance in the liquid during separation and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

6. In the separation of a substance from a mixture of that substance with a liquid in which said substance is insoluble, the process comprising finely dispersing in said mixture insoluble material of lower specific gravity than said liquid and being sufficiently finely divided to separate from said liquid at a slower rate than the substance to be separated therefrom and substantially increase the subsidence rate attainable by centrifugation of the resulting mixture by substantially lowering the specific gravity of the liquid with respect to the specific gravity of the substance to be separated therefrom, and thereafter subjecting the resulting mixture of said substance, said liquid and said added material to centrifugation to separate said substance from said liquid containing said added material, said insoluble material being so finely dispersed in said liquid that the mixture of said liquid and insoluble material acts similarly to a homogeneous liquid in the separation of said substance.

ASHTON T. SCOTT.